United States Patent [19]
Modgil

[11] Patent Number: 5,539,388
[45] Date of Patent: Jul. 23, 1996

[54] TELEMETRY AND CONTROL SYSTEM

[75] Inventor: O. S. Modgil, Mesquite, Tex.

[73] Assignee: National Digital Electronics, Inc., Dallas, Tex.

[21] Appl. No.: 478,425

[22] Filed: Jun. 7, 1995

Related U.S. Application Data

[63] Continuation of Ser. No. 16,771, Feb. 11, 1993, abandoned.

[51] Int. Cl.$^6$ .................................................. H04Q 1/00
[52] U.S. Cl. ........................... 340/825.17; 340/825.06
[58] Field of Search .................... 340/825.17, 825.43,
340/825.57, 825.77, 825.78, 825.06, 825.58,
870.39, 425.5, 426, 428, 438, 445, 449,
450, 451, 538, 310.01, 310.02, 310.06;
307/10.1, 10.7, 38; 370/85.1

[56] References Cited

U.S. PATENT DOCUMENTS

| | | |
|---|---|---|
| 1,654,450 | 12/1927 | Blake . |
| 2,729,750 | 1/1956 | Draper et al. . |
| 2,888,611 | 5/1959 | Matkins ................................. 315/82 |
| 3,209,326 | 9/1965 | Heiser .................................. 340/63 |
| 3,467,835 | 9/1969 | De Cola ............................... 307/125 |
| 3,500,119 | 3/1970 | Price ..................................... 315/82 |
| 3,500,120 | 3/1970 | Schultz ................................. 315/82 |
| 3,519,837 | 7/1970 | Nolin et al. ........................... 307/10 |
| 3,525,875 | 8/1970 | Ziomek ................................. 307/10 |
| 3,553,472 | 1/1971 | Arlandson et al. ................... 290/38 |
| 3,591,845 | 7/1971 | Vanderpoel, Jr. et al. ............ 307/10 |
| 3,600,596 | 8/1971 | Aloisantoni .......................... 307/10 |
| 3,628,085 | 12/1971 | Brock .................................. 315/82 |
| 3,651,454 | 3/1972 | Venema et al. ....................... 340/52 F |
| 3,689,886 | 9/1972 | Durkee . |
| 3,692,965 | 9/1972 | Gardner ............................... 200/44 |
| 3,706,005 | 12/1972 | Carlson ................................ 315/82 |
| 3,729,710 | 4/1973 | Sherwin .............................. 340/171 R |
| 3,740,713 | 6/1973 | Teich .................................... 340/64 |
| 3,763,415 | 10/1973 | Ownby ................................. 320/6 |

(List continued on next page.)

OTHER PUBLICATIONS

Immobilok Profit Schedule.
Securalok Systems USA, Ltd—Immobilok article Oct. 1993, p. 49.
Immobilok—State of the Art Vehicle Theft Prevention System Brochure.
Specification entitled, "Multiplex system simplifies bus wiring," *Automotive Engineering*, 89(1):34–35, Jan., 1981.
Specification entitled, "Multiplexing simplifies and expands driver controls," *Automotive Engineering*, 88(8):50–56, Aug., 1980.
Foerate, "Automotive 'Signalbugs' Multiplex Wiring System," Second International Conference on Automotive Electronics, 29 Oct.–2 Nov., 1979, pp. 263–267.
Massoubre and Reverdin, "A Multiplexed Wiring System for Cars and Its Electronics," Second International Conference on Automotive Electronics, 20 Oct.–2 Nov., 1979, pp. 268–272.

*Primary Examiner*—Brian Zimmerman
*Assistant Examiner*—Edwin C. Holloway, III
*Attorney, Agent, or Firm*—Arnold, White & Durkee

[57] ABSTRACT

A telemetry and control system is disclosed for use in direct current power wiring applications, such as those used in automobiles or other vehicles. The system includes a master transmitter which encodes data as a train of current pulses which modulate the d.c. supply voltage. A slave receiver at another location, connected to the same power source through pre-existing wiring, amplifies the supply voltage modulation, recovers the data waveform, and decodes it, to effect an action or display a measurement or status indication. A second transmitter combined with the slave receiver may transmit data similarly for reception by a second receiver combined with the master transmitter, to enable two-way communication therebetween. Applications of the system include an emergency battery booster, an anti-theft battery disconnection device, a distress alert system, activation and reception of data from outboard devices, and remote measurement of fluid levels, temperatures and pressures.

40 Claims, 9 Drawing Sheets

U.S. PATENT DOCUMENTS

| | | | |
|---|---|---|---|
| 3,784,839 | 1/1974 | Weber | 307/10 AT |
| 3,790,806 | 2/1974 | Lessard | 290/37 |
| 3,879,617 | 4/1975 | Faller | 307/10 LS |
| 3,886,534 | 5/1975 | Rosen et al. | 340/216 |
| 3,944,742 | 3/1976 | Cunningham | 178/66 R |
| 3,944,981 | 3/1976 | Akita et al. | 340/147 R |
| 3,949,289 | 4/1976 | Day | 320/6 |
| 3,971,010 | 7/1976 | Foehn | 340/310 R |
| 3,975,708 | 5/1976 | Lusk et al. | 340/438 |
| 3,997,870 | 12/1976 | Horvath | 340/63 |
| 4,023,138 | 5/1977 | Ballin | 340/64 |
| 4,057,742 | 11/1977 | Binegar | 307/10 LS |
| 4,090,089 | 5/1978 | Morello et al. | 307/40 |
| 4,093,945 | 6/1978 | Collier et al. | 340/279 |
| 4,093,946 | 6/1978 | Fowler et al. | 340/310 R |
| 4,099,157 | 7/1978 | Enabnit | 340/52 F |
| 4,123,748 | 10/1978 | Otani | 340/558 |
| 4,139,801 | 2/1979 | Linares | 315/83 |
| 4,143,368 | 3/1979 | Route et al. | 340/543 |
| 4,159,467 | 6/1979 | Ballin | 340/64 |
| 4,174,517 | 11/1979 | Mandel | 340/310 A |
| 4,180,043 | 12/1979 | Kawamura | 123/146.5 B |
| 4,209,709 | 6/1980 | Betton | 307/10 AT |
| 4,222,034 | 9/1980 | Orenzow | 340/64 |
| 4,236,594 | 12/1980 | Ramsperger | 180/167 |
| 4,275,440 | 6/1981 | Adams, Jr. et al. | 364/200 |
| 4,288,778 | 9/1981 | Zucker | 340/64 |
| 4,321,681 | 3/1982 | Sackin et al. | 364/492 |
| 4,330,716 | 5/1982 | Rust | 307/10 LS |
| 4,354,268 | 10/1982 | Michel et al. | 371/20 |
| 4,379,284 | 4/1983 | Boykin | 340/310 R |
| 4,383,242 | 5/1983 | Sassover et al. | 340/64 |
| 4,400,761 | 8/1983 | Hayden et al. | 361/400 |
| 4,463,340 | 7/1984 | Adkins et al. | 340/426 |
| 4,463,341 | 7/1984 | Iwasaki | 340/310 A |
| 4,464,765 | 8/1984 | Shimizu | 375/17 |
| 4,514,719 | 4/1985 | Suzuki et al. | 340/310 R |
| 4,523,178 | 6/1985 | Fulhorst | 340/64 |
| 4,533,889 | 8/1985 | Knight | 335/199 |
| 4,540,875 | 9/1985 | Buttolph, III | 219/364 |
| 4,540,890 | 9/1985 | Gangemi et al. | 340/310.01 |
| 4,553,127 | 11/1985 | Issa | 340/64 |
| 4,556,866 | 12/1985 | Gorecki | 340/310 A |
| 4,558,260 | 12/1985 | Masegi | 315/82 |
| 4,602,127 | 7/1986 | Neely et al. | 179/2 A |
| 4,607,246 | 8/1986 | Wada et al. | 340/52 F |
| 4,611,274 | 9/1986 | Machino et al. | 364/200 |
| 4,613,791 | 9/1986 | Kurihara et al. | 315/82 |
| 4,639,714 | 1/1987 | Crowe | 340/310 R |
| 4,641,322 | 2/1987 | Hasegawa | 375/1 |
| 4,686,423 | 8/1987 | Eydt | 315/82 |
| 4,694,408 | 9/1987 | Zaleski | 364/551 |
| 4,714,912 | 12/1987 | Roberts et al. | 340/310 R |
| 4,759,050 | 7/1988 | Mellon | 379/36 |
| 4,785,195 | 11/1988 | Rochelle et al. | 307/18 |
| 4,788,542 | 11/1988 | Tanabe | 340/825.31 |
| 4,791,311 | 12/1988 | Vig | 307/10.1 |
| 4,813,443 | 3/1989 | Pounder | 137/1 |
| 4,831,560 | 5/1989 | Zaleski | 364/551.01 |
| 4,835,514 | 5/1989 | Masegi et al. | 340/426 |
| 4,835,533 | 5/1989 | Akutsu | 340/825.31 |
| 4,835,764 | 5/1989 | Sulzbacher et al. | 370/29 |
| 4,838,377 | 6/1989 | Kozaki et al. | 180/287 |
| 4,841,199 | 6/1989 | Irie | 315/83 |
| 4,847,782 | 7/1989 | Brown, Jr. et al. | 364/492 |
| 4,878,173 | 10/1989 | Goekjian | 364/200 |
| 4,884,055 | 11/1989 | Memmola | 340/426 |
| 4,888,575 | 12/1989 | De Vaulx | 340/426 |
| 4,907,222 | 3/1990 | Slavik | 307/10.1 X |
| 4,908,498 | 3/1990 | Kivelä | 219/494 |
| 4,912,553 | 3/1990 | Pal et al. | 340/310.01 |
| 4,925,750 | 5/1990 | Theiss | 429/116 |
| 4,926,158 | 5/1990 | Zeigler | 340/310 A |
| 4,956,562 | 9/1990 | Benedict et al. | 307/10.8 |
| 4,956,580 | 9/1990 | Yun-Shang | 315/83 |
| 4,958,084 | 9/1990 | Carlo et al. | 307/10.2 |
| 4,962,456 | 10/1990 | Abe et al. | 364/431.01 |
| 4,972,290 | 11/1990 | Sun et al. | 361/64 |
| 4,975,847 | 12/1990 | Abe et al. | 364/424.03 |
| 4,985,660 | 1/1991 | Cronk | 315/82 |
| 5,003,476 | 3/1991 | Abe | 364/424.03 |
| 5,025,253 | 6/1991 | DiLullo et al. | 340/825.06 |
| 5,029,124 | 7/1991 | Leahy et al. | 364/900 |
| 5,033,112 | 7/1991 | Bowling et al. | 455/603 |
| 5,038,372 | 8/1991 | Elms et al. | 379/94 |
| 5,040,168 | 8/1991 | Maue et al. | 359/115 |
| 5,040,193 | 8/1991 | Leonowich et al. | 375/87 |
| 5,049,867 | 9/1991 | Stouffer | 340/426 |
| 5,058,044 | 10/1991 | Stewart et al. | 364/551.01 |
| 5,059,918 | 10/1991 | Brahms et al. | 330/11 |
| 5,120,981 | 6/1992 | Cope | 307/10.8 |
| 5,132,660 | 7/1992 | Chen et al. | 340/428 |
| 5,142,278 | 8/1992 | Moallemi et al. | 340/825.06 |
| 5,172,291 | 12/1992 | Bakely et al. | 361/85 |
| 5,187,709 | 2/1993 | Williamson et al. | 370/85.3 |
| 5,196,823 | 3/1993 | Formigoni | 340/310 R |
| 5,200,877 | 4/1993 | Betton et al. | 361/92 |
| 5,224,567 | 7/1993 | Tomlinson | 180/287 |
| 5,227,762 | 7/1993 | Guidette et al. | 340/310 R |
| 5,229,648 | 7/1993 | Sues et al. | 307/10.2 |
| 5,229,745 | 7/1993 | Koide et al. | 340/451 |
| 5,231,331 | 7/1993 | Meister | 315/82 |
| 5,243,322 | 9/1993 | Thompson et al. | 340/429 |
| 5,271,526 | 12/1993 | Williams | 222/16 |
| 5,274,354 | 12/1993 | Sato | 340/430 |
| 5,280,267 | 1/1994 | Reggiani | 340/426 |
| 5,285,186 | 2/1994 | Chen | 340/428 |
| 5,291,527 | 3/1994 | Haruyama | 375/94 |
| 5,296,788 | 3/1994 | Betton et al. | 318/283 |
| 5,296,997 | 3/1994 | Betton et al. | 361/92 |
| 5,307,048 | 4/1994 | Sonders | 340/426 |
| 5,313,388 | 5/1994 | Cortis | 364/424.04 |
| 5,318,449 | 6/1994 | Schoell et al. | 434/305 |
| 5,331,214 | 7/1994 | Mori et al. | 307/116 |
| 5,333,785 | 8/1994 | Dodds et al. | 239/69 |
| 5,345,592 | 9/1994 | Woodmas | 455/3.3 |
| 5,355,114 | 10/1994 | Sutterlin et al. | 340/310 A |
| 5,374,852 | 12/1994 | Parkes | 307/10.8 |

TELEMETRY AND CONTROL SYSTEM

This is a continuation of application Ser. No. 08/016,771, filed Feb. 11, 1993, now abandoned.

TECHNICAL FIELD

The invention relates to a method and apparatus for transmission and reception of control and telemetry signals through existing power wiring. More particularly, it relates to a method for such transmission and reception between apparatus at two or more different locations in an environment where only power wiring exists for application of direct current from a common power source to equipment at different locations therein.

BACKGROUND OF THE INVENTION

It is often desirable to install apparatus for transmitting and receiving control and telemetry signals as an adjunct to existing equipment connected to a common source of power. Such apparatus enables a user in one location to transmit a signal to another location for purposes of controlling equipment thereat, or to receive information from a remote location concerning the status of equipment or other conditions thereat.

In known systems used for home security and lighting control purposes, for instance, coded signals are applied to an a.c. power main's outlet at one location, and are received at another location for controlling a device or for monitoring conditions at the first location. Typically, such signals are transmitted by means of a high-frequency carrier impressed upon the a.c. main's voltage, and modulated with a specific code designating the particular function desired, the receiver of such signals being adapted to detect the high-frequency signals and to demodulate them, to recover the specific code and act on it to perform the desired function, for example to switch a light on or off, or to display the condition present at the transmitter's location.

Although such systems have been applied extensively for home use, a similar system may be particularly desirable for automobile use, and because the power supply of an automobile or other vehicle employs direct current (d.c.), the transmitter and receiver may advantageously be made simpler than is possible for the known systems mentioned above. However, a d.c. power supply such as that used in a vehicle direct current power system usually has an extremely low internal resistance, on the order of approximately 1–2 milliohms. Thus, it is difficult to impress control signals on the lines of the system, and the use of such control signals will often interfere with other components of the system.

Known remote control systems for use in automobiles or other vehicles therefore typically employ either a radio frequency (r.f.), ultrasonic, or infrared (IR) transmission system having no direct wiring between transmitter and receiver-actuator modules, or employ direct additional wiring between these modules. These systems all have their disadvantages.

R.f. systems are limited to communications between modules in the same space in the car, as there is usually a metal bulkhead between the passenger and engine compartments which prevents reliable radio transmission and reception between them. A similar limitation occurs with infrared and ultrasonic transmissions. Direct wiring between the two areas, however, involves difficulties for user installation, as the bulkhead also forms a firewall and the seal must be effectively maintained.

SUMMARY OF THE INVENTION

The foregoing problems are solved and a technical advance is achieved by a system for transmitting and receiving telemetry and control signals between different locations over existing direct current power wiring. The system enables intercommunication and control between remote locations connected to, for example, the power harness of a vehicle such as an automobile. In a departure from the art, the system generates, at a first location connected to the wiring, a pulsed signal coded according to a desired telemetry or control function, and impresses the signal on the wiring by causing a corresponding pulsed current to flow through the wiring. The pulsed current is detected at a second location on the wiring and decoded to provide the desired telemetry or control function.

The system has particular application as a reliable means of transmission of coded signals between different locations connected to the direct current power harness of a vehicle, to measure various conditions and actuate devices in response to user commands. In one embodiment, the system includes a portable master control unit that may be plugged into the cigarette lighter of a vehicle to access the wiring system. The control unit monitors conditions of modules connected to the wiring at other locations, such as in the engine compartment or outside the vehicle, and responsive to user commands, effects actuation of the modules to perform specific functions. Both the control unit and the remote modules are capable of being equipped with transmitter and receiver circuitry, thereby enabling two-way communications.

In a vehicle application, pulsed signal intercommunication between remote locations connected to the direct current harness is performed for purposes which include: connection of an auxiliary battery to recharge the principal vehicle car battery when a monitoring module detects an insufficient charge on the principal battery for starting the vehicle; disconnection of the principal battery to immobilize the vehicle when an unauthorized person attempts to start the vehicle without first connecting a module which transmits a unique coded signal; measurement of various fluid levels, pressures and temperatures for display to the user where such gauges are not provided as original equipment; alerting others to a distress in such circumstances as kidnapping, carjacking or roadside emergencies; alerting the driver and other persons of objects behind or near the vehicle; and transmitting the response of an outboard radar detector to the driver. A variety of similar uses are contemplated.

In an illustrative embodiment, the system comprises a transmitter circuit at a first location connected to direct current power wiring for generating a pulsed signal coded according to a desired telemetry or control function. The transmitter impresses the pulsed signal on the wiring by causing a corresponding pulsed current to flow through the wiring. A receiver circuit at a second location connected to the wiring determines the presence of the pulsed current through the wiring. The receiver regenerates and decodes the pulsed signal to perform the desired telemetry or control function. The transmitter circuit includes an electrical transducer for converting a desired measured quantity or user input to an electrical signal, a signal encoding circuit for converting the electrical signal into a pulsed signal, and a circuit for causing a current to flow in the wiring, the current being controlled by and corresponding to the pulsed signal. The receiver circuit includes amplifier circuitry for monitoring and amplifying fluctuations of the voltage on the wiring due to the presence of the pulsed current caused to flow therein, pulse recovery circuitry for determining from the fluctuations of the voltage the transition times of the pulsed signal and for reconstituting therefrom the coded pulsed signal, and decoder circuitry for determining from the pulsed signal the coded measured quantity or user input represented thereby.

A technical advantage achieved with the invention is that it provides a reliable and easy to install arrangement for transmission of coded signals through the existing electrical power wiring harness of a vehicle, requiring only a power and chassis ground connection of remote modules, for both transmission and reception of information.

DETAILED DESCRIPTION

Figure 1:
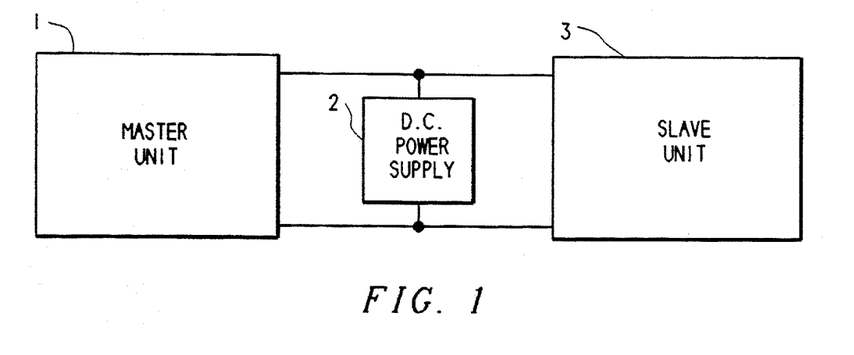
FIG. 1 is a block diagram illustrating a master unit and a slave unit of a d.c. power line communication system according to the invention.

In FIG. 1, there is shown in block schematic form a generalized illustration of a communication system according to the invention. A master unit 1 is connected to receive power from a d.c. power supply 2, whose supply voltage is modulated by the master unit 1. The power supply 2 is also connected to supply power to a slave unit 3 and the modulation of its voltage is also detected by slave unit 3 and employed to perform any function designated by the master unit 1.

While unit 1 is designated the master unit and unit 3 is the slave unit, the symmetry of the figure suggests that the slave unit 3 could just as easily impress modulation onto the power supply voltage from power supply 2, and the master unit could as easily detect such modulation and effect some function designated by the slave unit 3. Thus the communication between master unit 1 and slave unit 3 can be full duplex, or two-way communication.

Figure 2:
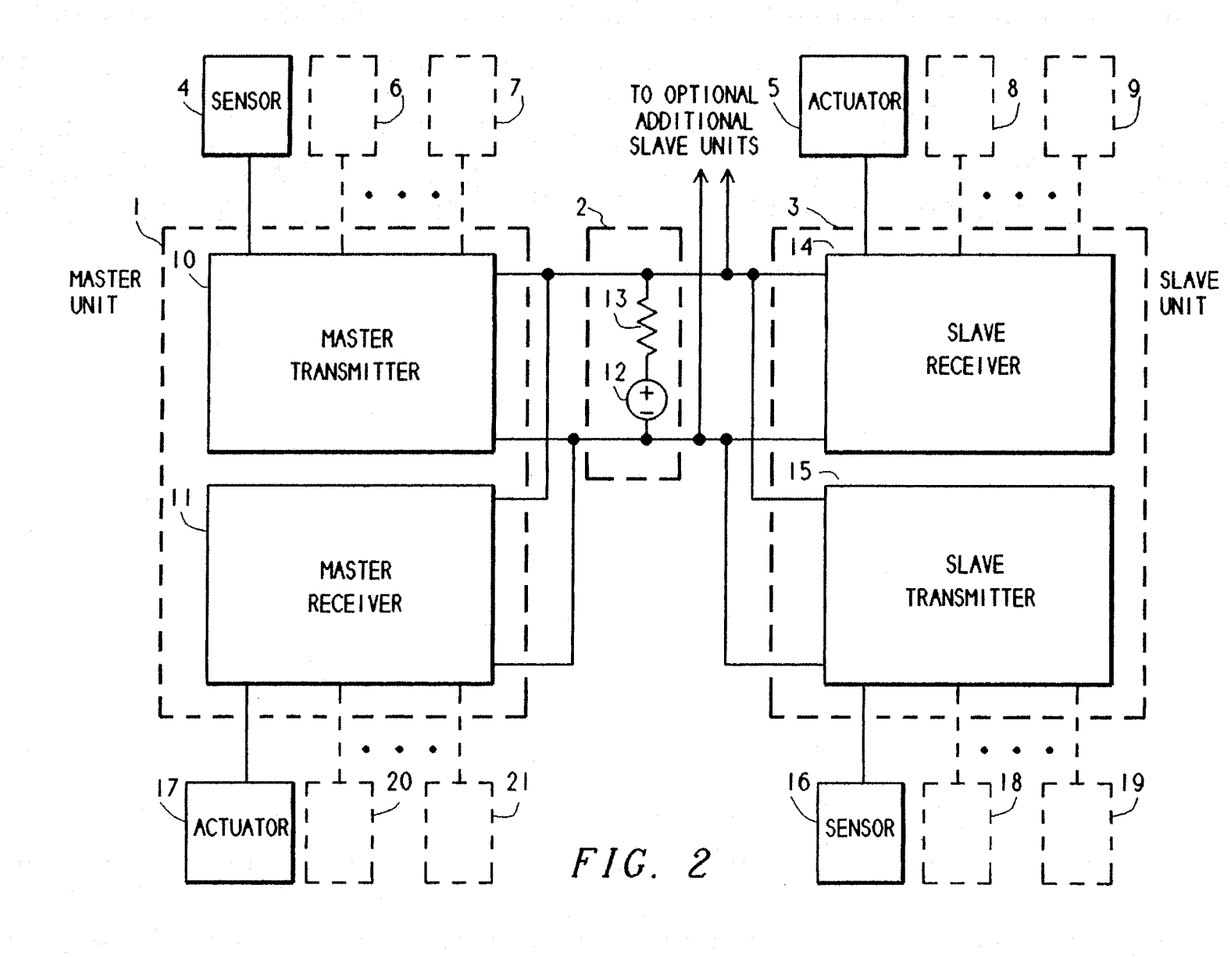
FIG. 2 is a more detailed block diagram of the system of FIG. 1.

The more detailed block schematic of FIG. 2 shows how this can be achieved, and suggests possible applications for this technique.

In FIG. 2, the master unit 1 is seen to receive an input from a sensor device 4, and the slave unit 3 effects an output to an actuator device 5. In addition, optionally, a number of input devices 6 through 7 may be connected to the master unit 1, and a number of output devices 8 through 9 may be optionally connected to the slave unit 3. It can be seen that the master unit 1 comprises a master transmitter 10 and a master receiver 11. The d.c. power supply 2 is modeled by an ideal voltage source 12 in series with an impedance 13, which may be frequency-dependent, and in the case of an automotive battery as the voltage source, may also depend upon the temperature, state of charge, age, or electrolyte level thereof. The slave unit 3 is seen to comprise a slave receiver 14 and a slave transmitter 15.

More particularly, the input devices 4, 6–7, are connected to the master transmitter 10, while the output devices 5, 8–9, are connected to the slave receiver 14. Similarly, the slave transmitter 15 may receive an input from a sensor device 16, the master receiver 11 being connected to an actuator device 17, and further input devices 18–19 may be optionally connected to slave transmitter 15, while optional output devices 20–21 may be connected to master receiver 11. A system such as this may be used for a variety of purposes, and although in many cases full duplex transmission may be desired as shown in FIG. 2, it is also envisaged that for some uses only the master transmitter 10, slave receiver 14, and associated devices may be provided, if one-way communication is sufficient for the particular application.

The principle of operation of the system shown in FIG. 2 is the following. In order to impress a signal modulation onto the d.c. power supply 2, it is necessary that this power supply should have a non-zero impedance, which is represented by a resistor 13. If the current drawn by master transmitter unit 10 is not constant, the variations therein will be reflected by changes in voltage drop across the impedance 13, thereby modulating the supply voltage of d.c. power supply 2. While the slave receiver 14 is powered from this supply, it may also include means for amplifying and detecting the modulation of the supply voltage by master transmitter 10, and for decoding the information represented by the modulation.

In response to an input from the sensor device 4, the master transmitter 10 encodes a particular modulation onto the d.c. power supply 2, this being transmitted through the power wiring of the vehicle to the slave receiver 14 which may be in a different location. This modulation is detected and decoded by the slave receiver 14 and is applied to control the output actuator device 5.

Figure 9:
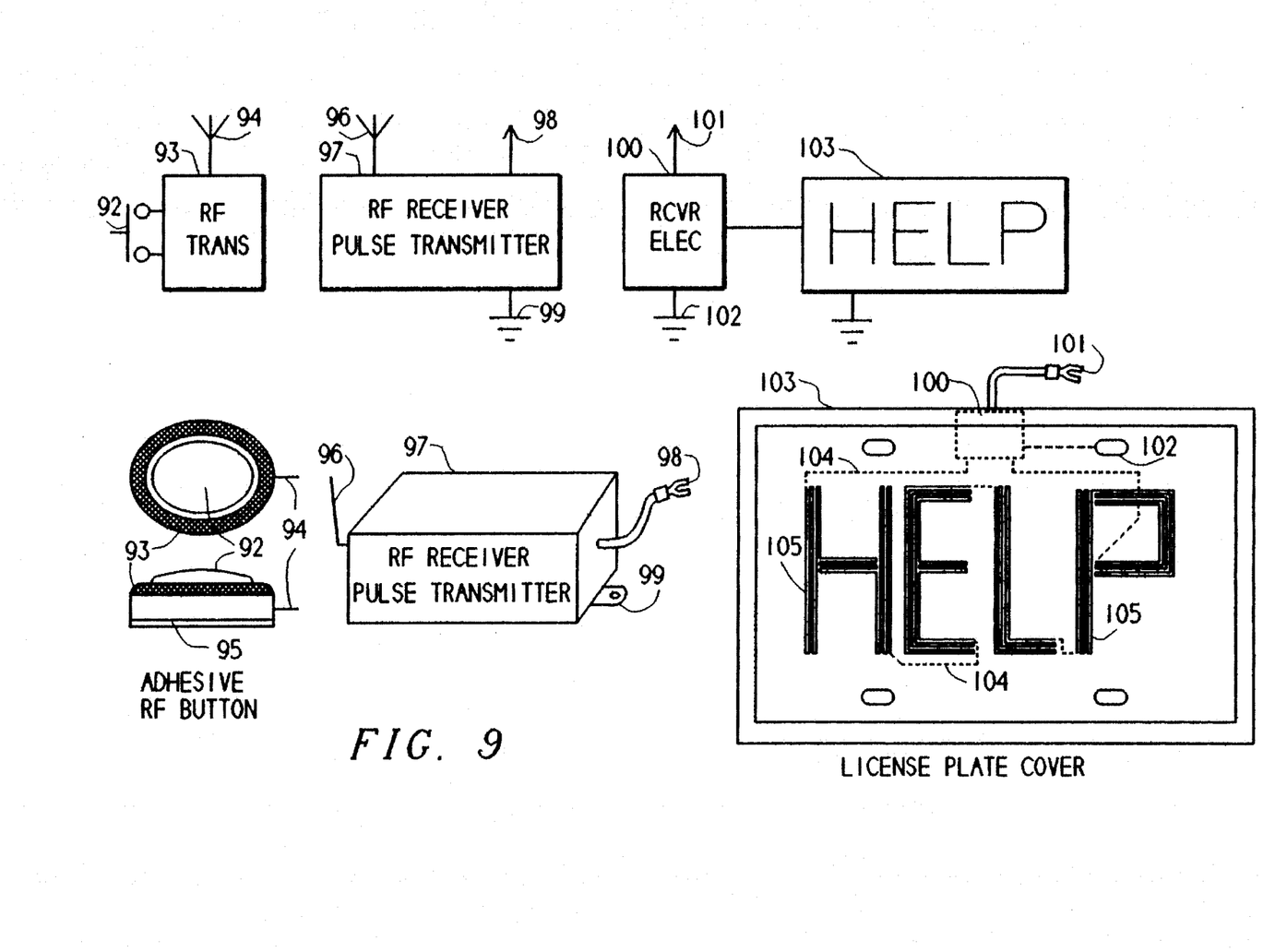
FIG. 9 is a block schematic of the system of FIG. 1 showing components configured for a distress alert system.

For example, the sensor input device 4 may comprise a switch operated by the user, and the output actuator device 5 may comprise an illuminated sign which is flashed on and off by the slave receiver 14 when it receives a coded signal representing this function from the master transmitter 10. This sign may, for instance, flash the word "HELP" to other vehicles to indicate that the car driver needs assistance (FIG. 9).

Figure 3:
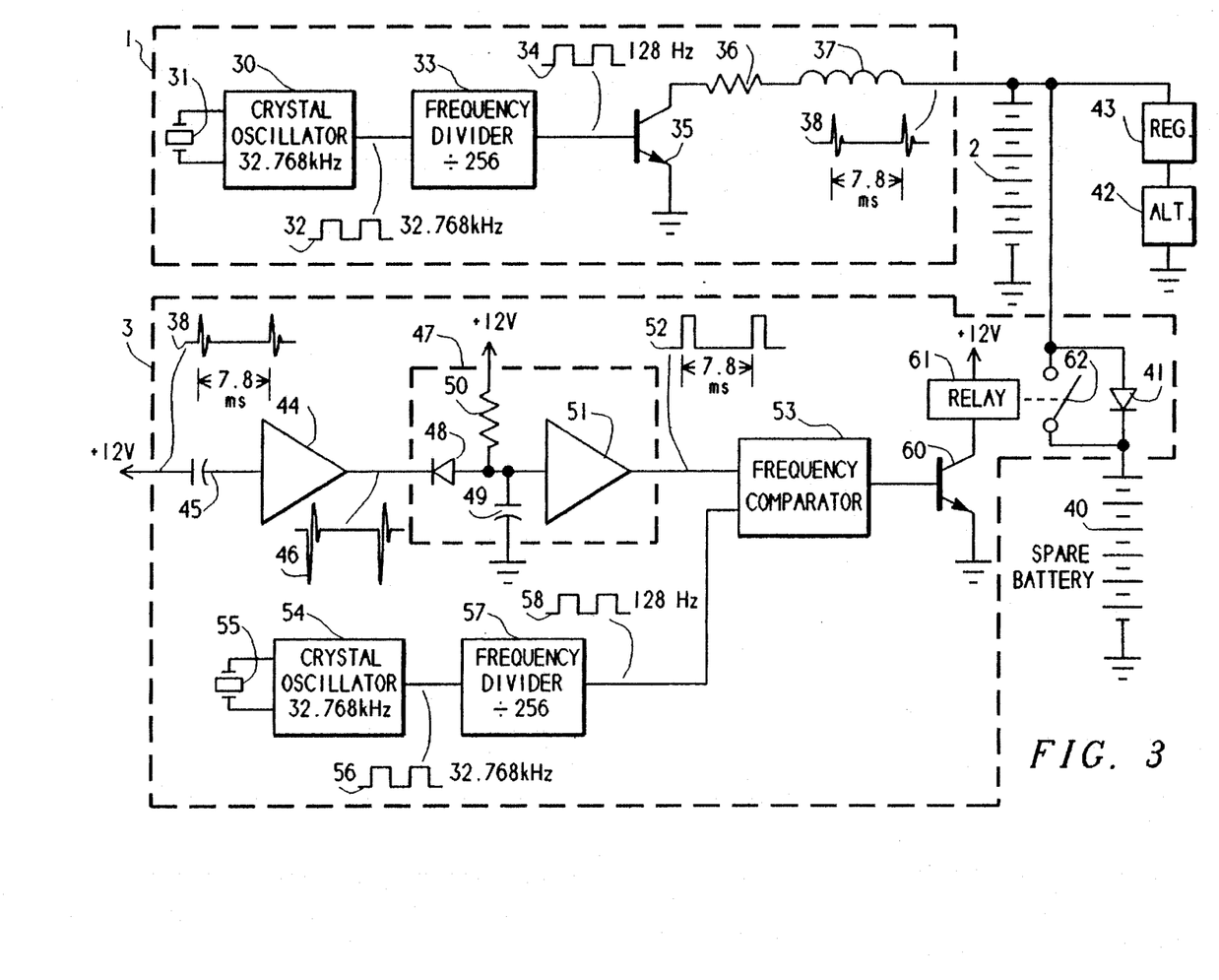
FIG. 3 is a block schematic of an embodiment of the system of FIG. 1 used for connecting a spare battery to recharge a main battery.

Alternatively, the master transmitter 10 may send a coded signal to a remote slave receiver 14 to connect a spare battery through suitable current limiting means to recharge the main car battery to a sufficient voltage for starting the car (FIG. 3).

In the latter case, the slave transmitter 15, if installed, could receive an input from device 16 to determine whether the battery voltage is sufficient for starting the car, and could send an indication of status back to the master receiver 11, where it might be displayed on output device 17, which could be a lamp or a liquid crystal display (LCD) to show the actual battery voltage. These and other examples of the use of the system of FIG. 2 will be described in detail with reference to later drawings.

In the prior art, control systems have been devised for installation in homes, for remote activation of lights, alarm devices, and heating controls, for example, from a central location, and for remote indication of status of devices attached to doors and windows, for example. Because such systems are powered by, and transmit signals through, the a.c. main's wiring, modulation has typically been performed by impressing a modulated high-frequency carrier signal onto the main's wiring. Such a system requires a certain complexity, as a high frequency carrier has to be generated and modulated, and the receiver has to be tuned to the carrier and must demodulate it.

Where a d.c. supply is available, however, it is discovered that the modulation scheme can be simpler, avoiding the need for complex circuitry to generate and modulate r.f. signals. It is sufficient to draw a fluctuating current from the power supply 2 in order to provide modulation thereon, and the receiver merely has to amplify and decode the fluctuating voltage thereby produced. It is recognized that impressing a very high frequency (VHF) or ultra-high frequency (UHF) signal on the lines of a d.c. power system can cause malfunction of attached components (such as controller or ignition systems in a vehicle). Accordingly, the technique of the present invention impresses a signal that is UHF only in its impulse response, and at the same time ultra low frequency (about 128 Hz) in period. This type of signal impression is similar to the "noise" induced by engine spark plugs in a vehicle power system, except that the impressed signal is highly periodic, i.e. "crystal-controlled." Thus, the signature of the impulse (rise and fall times) is always identical and predictable. The circuitry, described below, thereby takes advantage of these signal characteristics to produce signals which are isolated or distinguished from system noise. Likewise, because the impressed signals have a resemblance to commonly present signal noise, the various devices attached to the power system are adequately designed to filter out the impressed signals, obviating any damage.

Such a modulated current is produced herein by a switching device adapted to connect a load impedance across the power supply terminals in response to a coded pulsed signal applied to its controlling terminal, these components being contained in master transmitter 10. The slave receiver 14 amplifies and detects the pulsed modulation and regenerates and decodes the transmitted pulses, acting on the signal according to previously programmed functions corresponding to the possible codes sent to it.

It is contemplated that the modulating signal may comprise a series of pulses of varying length, frequency, duty ratio, amplitude, or other parameters, according to a predefined code system, each different modulation representing a different function to be effected or measurement to be displayed. For example, the output digitally coded temperature reading from a temperature sensor monitoring a fluid temperature in the engine compartment of a vehicle may be sent to a display unit plugged into the cigarette lighter in the passenger compartment of the vehicle, where the receiver decodes the pulses received and displays the temperature reading on an LCD display.

Furthermore, a code may be sent along with the actual temperature reading to indicate the location of the sensor or its purpose, and to indicate the appropriate destination of the signal.

Thus it may be seen that different signals may be present at the same time, differentiated by source and destination coding, emanating from different transmitter units, representing different functions or measurements, and being applied to different actuating or display means. The degree to which such signals may interfere with one another depends upon the particular details of the modulating scheme and hardware, as will be apparent to those skilled in the art, and therefore no details of any specific coding method are given here.

FIG. 3 illustrates a master unit 1 and slave unit 3 of a system according to the present invention. The master unit 1 comprises a crystal oscillator 30 with an associated crystal 31, a frequency dividing circuit 33, a transistor or other switching device 35, a current limiting resistor 36 and inductor 37 in series with its collector. The crystal oscillator provides a square wave 32 at its output, with a frequency of 32.768 kHz, for example.

With the specific crystal 31 having a frequency of 32.768 kHz and the division ratio of frequency divider 33 being 1/256, as shown in FIG. 3, a square wave 34 of frequency 128 Hz is provided to the base of the transistor 35. The transistor 35 therefore connects the current limiting resistor 36 and the series inductor 37 from the positive battery voltage to ground at this same rate, drawing a square wave current from the battery 2.

Figure 4:
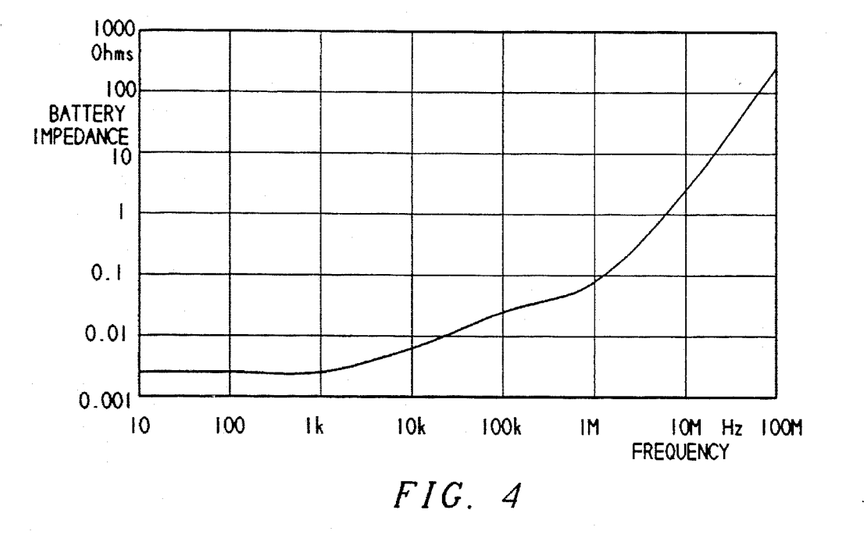
FIG. 4 is a graph illustrating the variation in battery impedance with frequency for an automobile battery.

Referring also to FIG. 4, the battery impedance increases with frequency, so the inductor 37 is included to compensate for the otherwise very "spiky" waveform that would result, and to act as a low-pass filter, preventing very high frequencies that could, for example, interfere with the vehicle's radio (not shown), from being impressed on the battery voltage when the transistor 35 switches on, but not when it switches off. The waveform impressed upon the battery comprises a low level signal 38 having substantial ringing at the transitions, such ringing being preferably limited to moderately low frequencies. In this instance, the master unit contains only a transmitter, which is therefore not separately identified.

Figures 6A, 6B:
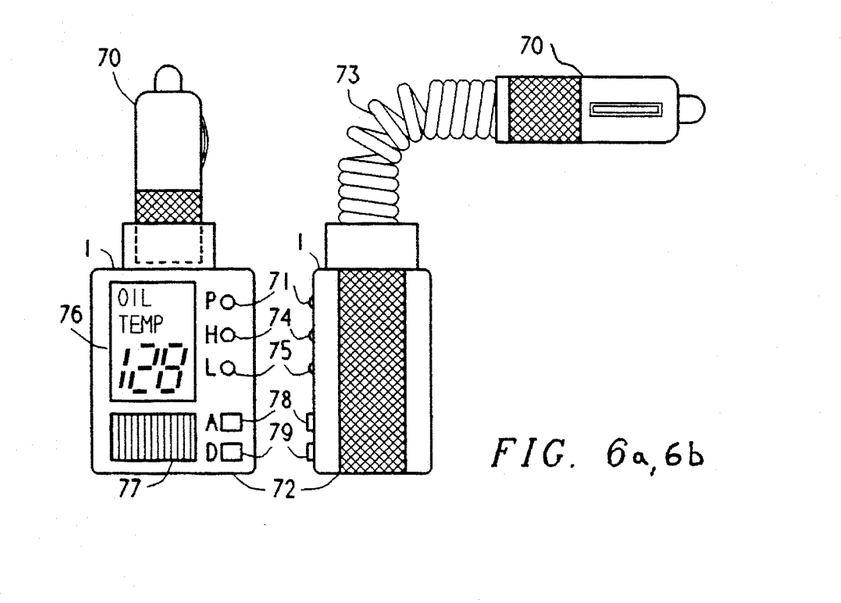
FIGS. 6a and 6b show respective front and side elevation views of the master transmitter of FIG. 5, having display means and user-operable switches.

Referring also to FIGS. 6a and 6b, the circuit of the master unit 1 is built into a small enclosure having a plug that may be plugged into the cigarette lighter socket (not shown) in the passenger compartment of a vehicle, for example.

The slave unit 3 (FIG. 3), located near the vehicle's battery 2 in the engine compartment, for example, is typically physically attached to a spare battery 40. The battery 40 is connected through a rectifier diode 41 to the main battery 2, which as shown in FIG. 2 may be represented by an ideal voltage source and a series impedance. The main battery 2 is also connected to the vehicle's alternator 42 through a regulator device 43. When the engine (not shown) is running, the alternator 42 charges the main battery, whose voltage may vary typically from 10.8 V up to as much as 15.6 V, although more typically it will be approximately 14 V. Thus the spare battery 40 can be charged through the diode 41 to about 13.5 V as long as the engine is running. As no current is drawn from this battery 40, it retains its charge indefinitely, ready to be used for emergency purposes.

When the vehicle is not running, the main battery 2 is no longer being charged, and its voltage may fall to about 12 to 13 V. This shuts off the diode 41 and prevents the spare battery 40 from discharging. If the main battery has discharged to a low enough voltage that the car will not start, this fact may be monitored by a device such as that labeled 16 in FIG. 2 attached to the slave unit 3, or by a device attached to the master transmitter 1. The slave unit 3, which has only a receiver, not separately identified, comprises an amplifier 44 which receives the pulsed coded signal 38 from the master unit 1 on the battery 2 through a coupling capacitor 45 and amplifies it to provide the signal 46 at its output. A pulse conditioning circuit 47 comprises a diode 48, capacitor 49 and resistor 50, together with an amplifier 51. The amplified spikes 46 received from amplifier 44 are applied to the cathode of diode 48, temporarily pulling the voltage on capacitor 49 more negative each time a pulse transition is detected. The amplifier 51 output swings positive to its maximum output, maintaining this until the voltage on capacitor 49, charged through resistor 50, goes positive, the output of amplifier 51 switching to its maximum negative output, where it remains until the next pulse transition occurs. Thus the series of spikes 46 are converted by pulse conditioning circuit 47 into a train of rectangular pulses 52 at the same frequency.

The output of the pulse conditioning circuit is connected to one input of a frequency comparator 53. A crystal oscillator 54 employing a crystal 55 oscillates at 32.768 kHz, and its output signal 56 is frequency divided by 256 in a frequency divider 57, thereby applying a 128 Hz square wave 58 to the other input of the comparator 53. When the frequencies of the two signals applied to the frequency comparator 53 are equal, the comparator 53 produces an output which is connected to a transistor 60, which in turn operates a relay 61. The relay contact 62 connects the positive terminal of the spare battery 40 to that of the main battery 2, suitable limiting means (not shown) being employed to limit the maximum current that may flow, to avoid damage to either battery or the relay contact 62. In its discharged condition, the internal resistance of the battery 2 may provide enough resistance to limit this current to a safe value.

Although not shown, the crystal oscillator 54 may also comprise circuitry for pulling its frequency in response to an output (not shown) of the frequency comparator 53 provided for synchronizing the internally generated frequency to the frequency of the train of rectangular pulses 52 whenever these frequencies are approximately equal.

It should be noted that in the absence of the transmitted 128 Hz signal from the master unit 1, no such connection will be made, as the slave unit 3 will not operate the relay 61 unless this signal is present. Furthermore, the receiver 3 circuitry only enables the comparator 53 when the battery voltage is initially too low to start the vehicle. The comparator 53 may remain enabled until the main battery 2 voltage has risen to a suitable value for starting the car. While it is possible for a slave transmitter like that labeled 15 in FIG. 2, if installed, to send to the master receiver 11 of FIG. 2, if present, a status signal indicating this condition, the master unit 1 can itself monitor the battery voltage and indicate when it has risen to a suitable value.

The user may now start the vehicle, and the alternator will again recharge both the main and spare batteries 2 and 40 ready for any future emergency situation of low main battery voltage. An advantage of this scheme is that no jumper cables or outside help are needed in most situations where a main battery has been accidentally discharged, saving the vehicle owner time and money, and resulting in a safer, easier solution.

The spare battery 40 must have sufficient capacity and voltage to ensure that an adequate charge can be transferred to the main battery to allow starting. A minimum suggested capacity would be 5 Ah. Furthermore, in the event that the main battery is so badly discharged as to fail to operate the transmitter and receiver units, a manual switch (not shown) can be provided on the battery 40 to connect it to the main battery for starting. In some vehicles, the lighter socket may not be powered when the ignition switch is off, and this may also be a reason to provide a manual switch on the spare battery itself.

In order for such a system to work, the battery 2 must be of sufficiently high impedance that a modest transmitter such as that shown in FIG. 3 can in fact modulate its voltage sufficiently to be received by a remote receiver.

FIG. 4, therefore, shows a graph of battery impedance against frequency for a typical car battery of 90 Ah capacity. It can be seen that at d.c. or very low frequencies, this impedance is only a few milliohms, but at frequencies in the MHz range it rises to a much higher impedance on the order of 0.1 to 300 ohms. This may be taken as typical of car batteries in general. Therefore, when a transistor is used to switch on and off a square wave current a noticeable spike may occur at the transitions, and may be amplified and used for performing a desired function, as shown in FIG. 3.

Figure 5:
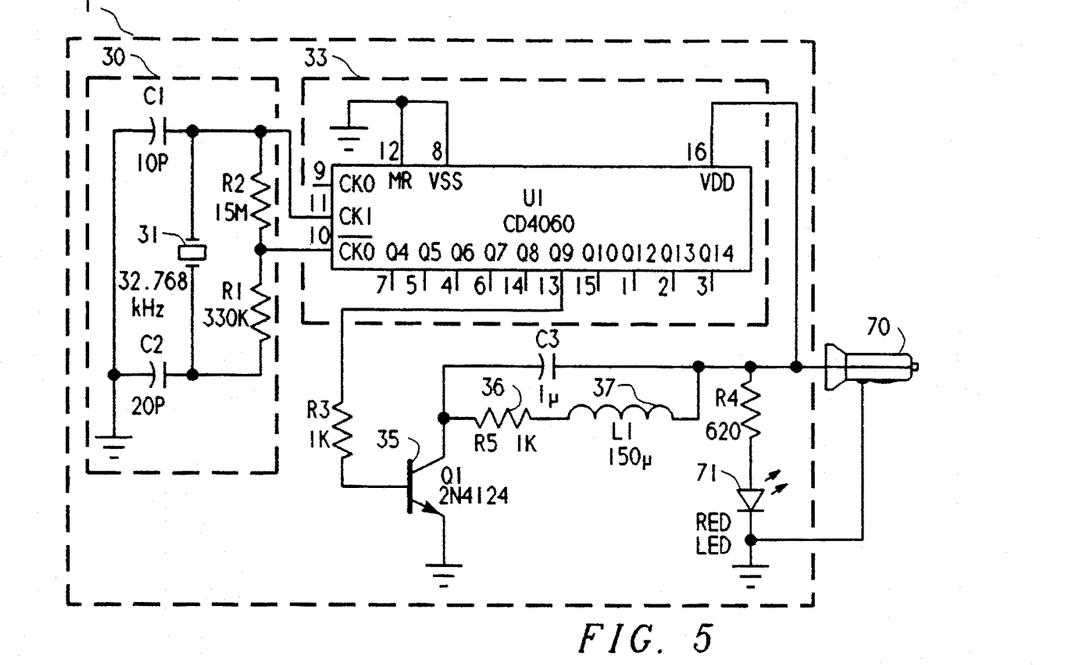
FIG. 5 is a detailed schematic of a simple master transmitter according to the invention.

FIG. 5 shows a representative transmitter schematic for use in a master unit 1 according to that of FIG. 3. The crystal oscillator and frequency divider are combined on a single CMOS integrated circuit, industry type CD4060, with a few additional components, represented by the numeral 33.

The crystal 31 is loaded with capacitors C1 and C2, and connected to the oscillator pins 11 and 10 of integrated circuit UI, which should not be confused with elements 10 and 11 in FIG. 2. Resistors R1 and R2 apply the voltage at pin 10 to the crystal, a portion of this voltage being fed back to pin 11 to maintain oscillation. The integrated circuit U1 then divides the frequency by 256 to obtain a 128 Hz square wave at pin 14 which is applied via a resistor R3 to the base of a transistor 35 labeled Q1, which may be for example an industry type 2N4124 device. The collector circuit of this transistor comprises the resistor 36 also labeled R5, the inductor 37, labeled L1, and a capacitor C3 shunting these components. Also across the power connections of the unit, which are made to a plug 70 of a type suitable for connection to the car's lighter socket, is a red light-emitting diode 71 in series with a resistor R4, for indicating that the device is properly connected and receiving power. Other status lights, not shown, may indicate to the driver when the battery voltage is sufficient for starting the car.

As illustrated in FIGS. 6a and 6b, such a master unit 1 may be made in a small enclosure 72 attached to the plug 70, or possibly detachable therefrom and having an extension cord 73 and means for mounting the unit in a convenient position. The unit may have, in addition to the power indication light 71, other status lights 74–75, a liquid crystal display (LCD) 76, an annunciator 77 and pushbutton or other switches 78–79, for example.

Figure 7:
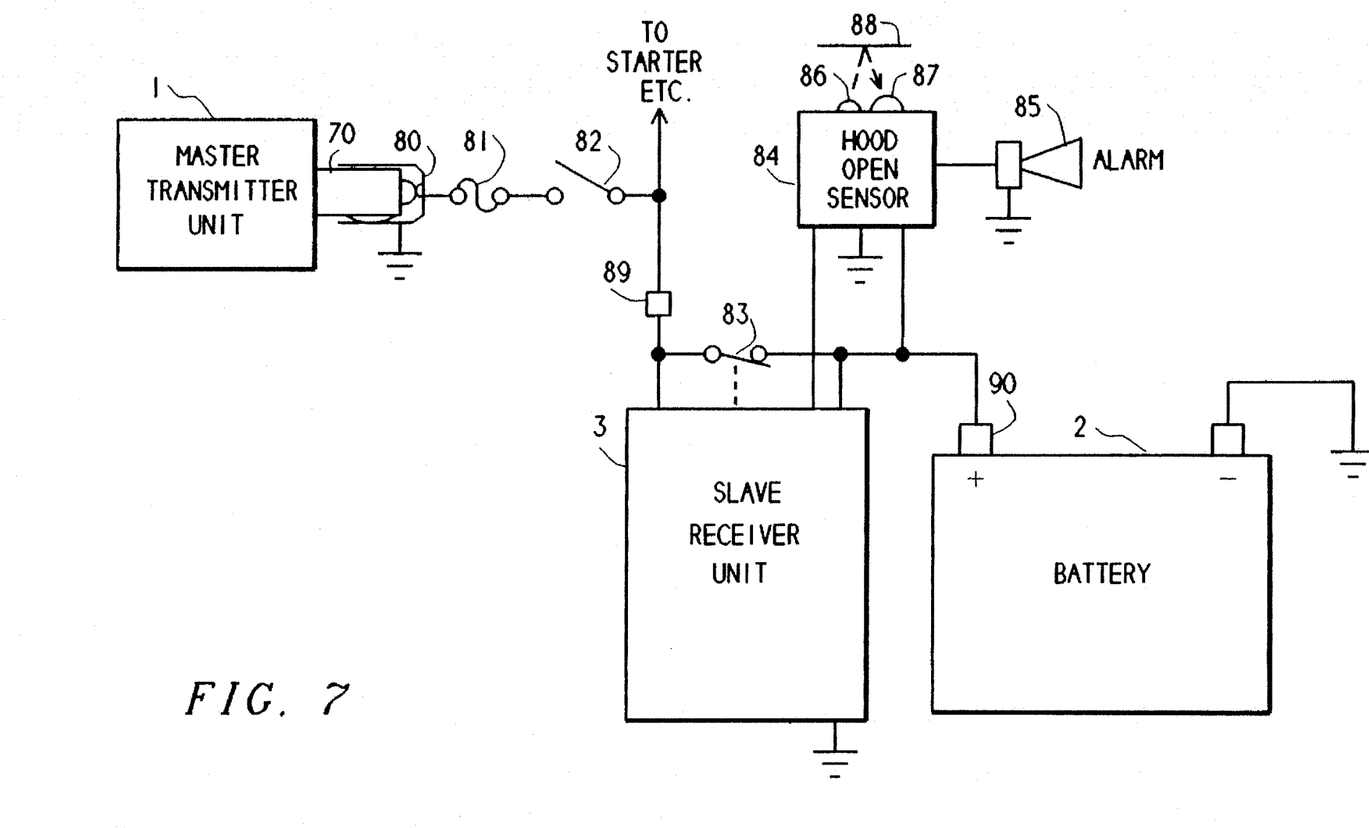
FIG. 7 is a block schematic of the system of FIG. 1 embodied as a vehicle anti-theft system.

FIG. 7 illustrates application of the present system to use as an anti-theft device. Although the master control unit 1 transmitter (FIG. 5) has no modulation of the pulse train, many known methods of modulation exist and may be adapted for use with this system; for example, the pulse width may be modulated yielding wide or narrow pulses for representing digital "1" or "0" bits of a repeated digital code. A transmitter 1 adapted to send an unique digital code, representing for example a personal identification number (PIN) may be used as an electronic "key" to enable the vehicle to be started. This transmitter plugs into the lighter socket 80. A receiver 3 in the engine compartment detects the special coded signal and enables starting. In the absence of the coded signal, any attempt to start the car causes a switch to be operated, which disconnects the car battery from the starter motor and prevents starting the car.

In FIG. 7, this security system is shown in block schematic form. The master unit 1 has a plug 70 which plugs into the lighter socket 80, the outer shell of which is grounded. The positive connection to the battery 2 is typically made through a fuse 81 and in some vehicles through the ignition switch 82.

In the engine compartment, the slave unit 3 is connected to the battery to receive the signal from the master unit 1. The slave unit 3 operates a battery disconnect switch 83 which disconnects the battery 2 when activated. In addition to the slave receiver 14 for receiving the transmitted signal from the master unit 1, there are other sensor and actuator devices attached to the receiver 3. One such device, 84, senses whether the hood (not shown) is closed or open and can actuate an alarm device 85 if the hood is opened without the master unit 1 being connected to the lighter socket 80.

In practice, the hood open sensor 84 is built into the slave unit 3, which in turn is strapped to the car battery 2 and preferably receives its power from the battery side of the switch 83. The sensor 84 may comprise an infrared emitter 86 and phototransistor 87 in conjunction with a reflective area or reflective tape 88 positioned under the hood, so that when the hood is closed, light from the infrared emitter 86 reaches the phototransistor 87, but is interrupted when the hood is opened. In addition a loud siren or other warning device 85 may be incorporated into the slave unit 3. Connectors 89 and 90 are shown for connection to the vehicle starter (not shown) and battery 2, respectively.

Figure 8:
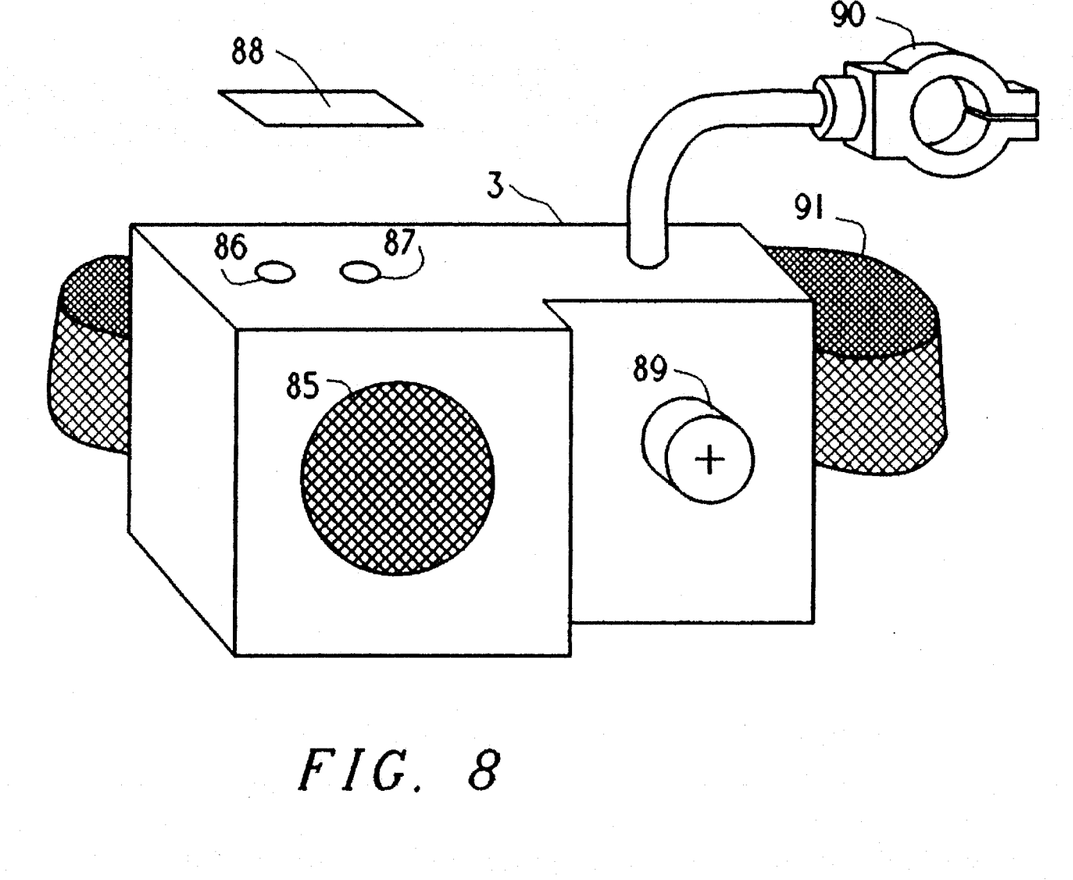
FIG. 8 is an enlarged, perspective view of the slave receiver unit of the system of FIG. 7.

FIG. 8 shows a rendering of the slave unit 3, sensor 84 and alarm 84 embodied as a self-contained battery disconnect unit. Such a disconnect unit, may have alternate connector types for use with different types of car battery, as will be evident to those skilled in the art. Components of the slave unit 3 are referenced with the same numerals used in reference to FIG. 7. Thus the battery post connector 89 provides power to the rest of the car, while the short heavy wire and clamp 90 is connected to the positive terminal of the battery 2 itself. A strap 91 is provided for securing the slave unit 3 to the battery 2 (not shown).

FIG. 9 illustrates an embodiment of the system used for providing a vehicle warning or emergency indication. The master unit 1 comprises a concealed switch 92, mounted somewhere in reach of the driver for hand or foot operation, and a transmitter unit 97 which sends a specific coded signal on the 12 V power wiring of the car to a receiver unit or units 100 when the switch is operated. The slave receiver unit 100 is powered from the nearest available 12 V wiring, and connected to a special license plate cover 103 having concealed illuminated letters spelling out the message "HELP", for example. These may be provided, for example, by concealed wiring 104 to wire filaments 105 in a gas-filled or evacuated chamber between two transparent plates forming the body of the license plate cover 103, or alternatively by a transmissive/reflective liquid crystal display, an array of light-emitting diodes, or other known methods. The illumination may be made to blink in order to attract the attention of other road users.

In FIG. 9, while the push-button switch 92 may be hard-wired to the transmitter unit 97, an effective implementation of this embodiment comprises a small, inconspicuous, battery-powered r.f. transmitter 93 which may have a short wire antenna 94 and an adhesive surface 95, so that the button may be easily installed in a concealed location known only to the vehicle driver. The pulse transmitter 97 may include an r.f. receiver for receiving the signal from the r.f. transmitter 93 through a short antenna 96. The pulse transmitter may be located somewhere under the dash, for example, the positive connection being made to a suitable hot power line by means of an insulation displacement connector 98, while the ground connection can be made through a mounting tab 99 screwed to the vehicle's chassis.

The slave receiver unit 100 is included as an electronics package with the license plate cover 103 and is powered by means of a wire with an insulation displacement connector 101 which may be connected to any suitable hot power line. A ground connection may be made through one of the license plate holder screw holes 102. The filament wires 105 forming the word "HELP" are interconnected through concealed wires 104 to the receiver electronics package of the unit 100.

Such a system can be used in the event of an abduction or "carjacking" of the occupants by a criminal assailant. As an adjunct, additional slave units or actuator devices may, for example, activate a car phone to send an automated distress message to the operator, and to transmit a beacon signal to permit authorities to locate and track the vehicle. If a battery disconnect module of the type shown in FIG. 7 has been installed, it may be activated to immobilize the vehicle, if conditions permit this to be done safely.

Figure 10:
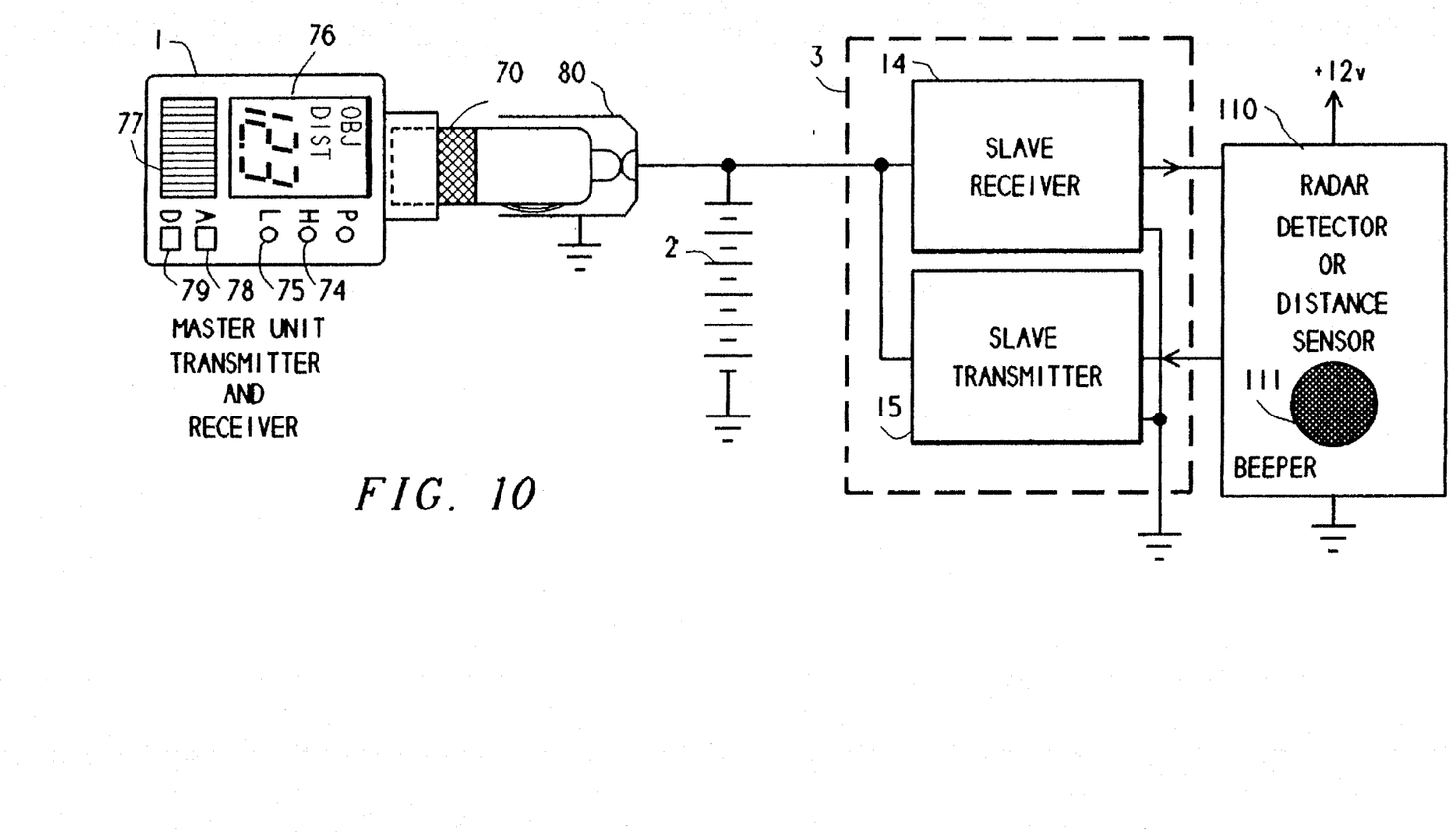
FIG. 10 is a block schematic of the system of FIG. 1 embodied as a system for activating an outboard sensor and receiving data therefrom.

FIG. 10 shows another embodiment of the invention which may be used to transmit information from an outboard electronic sensor device 110 to the master unit 1 in a vehicle passenger compartment. The sensor device 110 may comprise, for example, a radar detector or an ultrasonic ranging device mounted at a convenient location under the front or rear bumper of a vehicle, for example. The device 110 also incorporates a slave unit 3 for reception of a signal to activate the device 110 and for transmission of appropriate data from the device 110 to the vehicle driver.

The master unit 1 in the vehicle may be of the type shown in FIG. 6, having a master transmitter 10, master receiver 11 (see FIG. 2), at least an activation switch 78 and one or more status indicators 74–75, and preferably an audible annunciator 77 of some kind and an LCD display 76.

When the activation button 78 is pressed, the master transmitter 1 activates the outboard device 110 (or in the case of a ranging device for a backup alert application, it may be activated by connection of power to the vehicle's backup lights, for example.) The outboard device 110 includes a slave receiver 14 for receiving the activation signal, and a slave transmitter 15, which sends back to the master unit 1 a coded signal indicating its status.

For example, if the outboard device 110 is a radar detector, it could send a signal indicating the detection of radar signals in any operating band, plus an indication of signal strength. The master receiver 11 would then cause appropriate status lights 74–75 to indicate the detection of radar signals, and sound a "beep" tone on the annunciator device to provide audible indication of the received signal strength as is done in conventional radar detectors. The beep tone could vary in pitch, or repetition frequency, depending on the signal strength received.

Alternatively, in the case where the outboard device 110 is a ranging device used as a backup alert, a status light 74 on the master unit indicates the presence of reflecting objects behind the vehicle, while the distance reading for the nearest such object is displayed on an LCD display 76, and a warning tone whose pitch or repetition rate depended upon this reading is sounded on the annunciator device 77.

Additionally, the outboard ranging device 110 includes a beeper 111 for sounding a warning to people in the vicinity that the vehicle is backing up.

The outboard device 110 may also be mounted on a trailer whose electrical system is connected to the vehicle's electrical system, to provide an additional measure of security when backing up with a trailer in tow.

Figure 11:
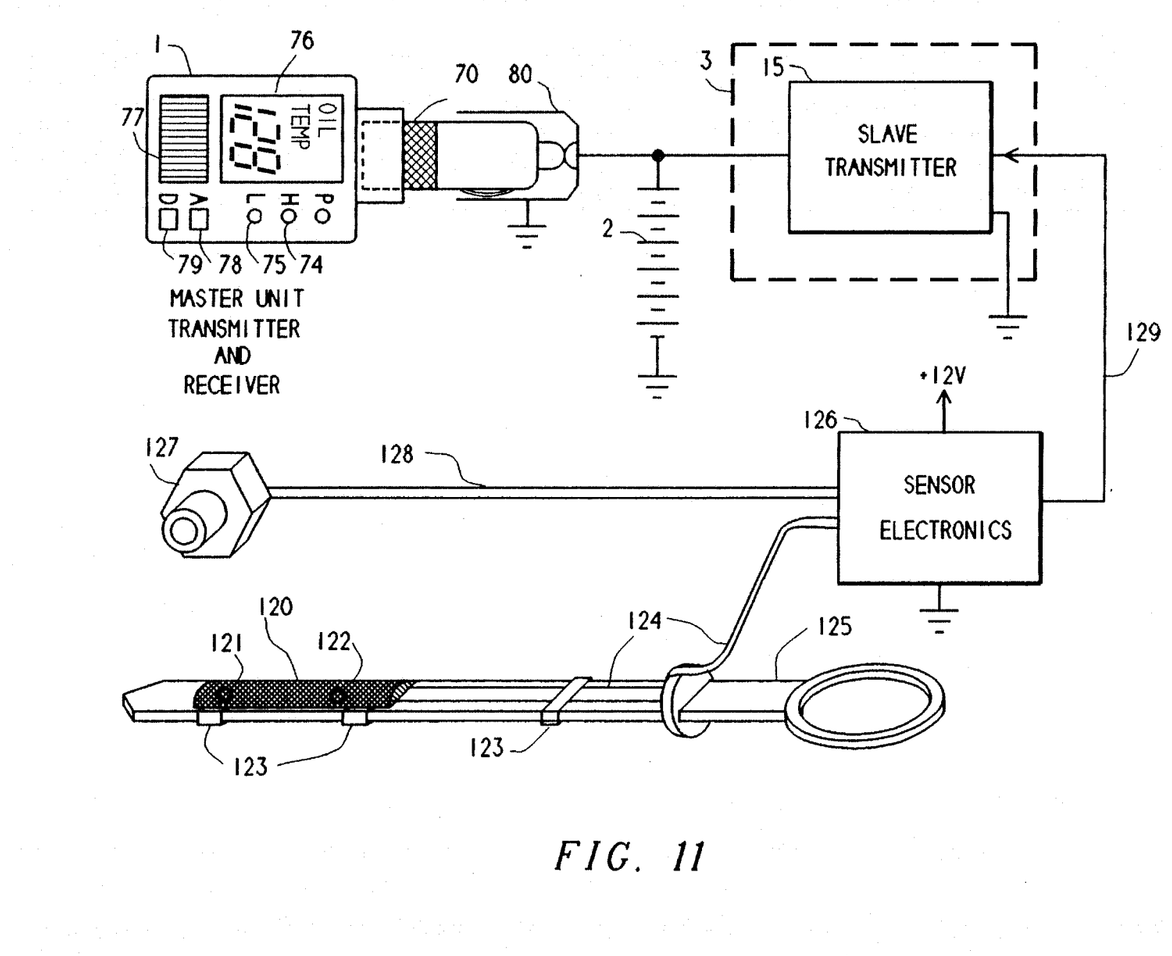
FIG. 11 is a block schematic of the system of FIG. 1 embodied as a system for transmitting engine parameters such as a fluid temperature, pressure and/or level to a display device.

FIG. 11 shows another embodiment of the invention, for use in monitoring various conditions in the engine compartment of a vehicle. In this application, patterned after the block schematic of FIG. 2, a number of different sensor elements may be connected to a common slave unit 3 for measuring and sending different environmental measurements to the vehicle driver.

Typically, a dipstick sensor unit 120 may include transducers 121, 122 for measurement of a fluid level and temperature, these measurements being effected by known methods. A sensor 121 is attached by means of clips or clamps 123, with additional clips securing a flat cable 124, to a fluid dipstick 125 which is inserted into the appropriate part of the engine or transmission. Close to, or attached to, the dipstick is the electronics package 126 which interprets the data received from sensor 120.

For example, a temperature measurement may be made by means of a thermistor 121 in the sensor 120 mounted to the dipstick, its resistance being measured by the sensor electronics package 126 and converted into a digital temperature reading. The electronics package 126 may be connected to the car's battery 2 (via the ignition switch to avoid unwanted battery drain when the engine is off), and to a slave transmitter 15, forming part of the slave unit 3 and possibly integrated with the sensor electronics package 126, for transmitting the temperature reading, along with the location of the sensor itself, to the master unit 1.

In addition, the sensor 120 may have a means for measurement of the fluid level. For example, a second thermistor 122 could be provided at a position on the dipstick 125 that would correspond to a low level mark. If both thermistors 121, 122 were operated at a sufficient current to provide some self-heating, when the fluid level was high enough to submerge this thermistor 122, both thermistors 121 and 122 would read the same temperature; however, if the thermistor 122 was exposed and not immersed in the fluid, its temperature could rise, and the difference in temperature could be used by the sensor electronics package 126 to signal a low fluid level condition to the driver. It is important to note that many fluids, such as the engine oil, can only be measured reliably under certain conditions, such as with the engine warmed up and stopped, as the level of the fluid varies depending upon whether the engine is running or stopped, the engine rpm., the fluid temperature, and other factors. However, a warning of abnormally low engine oil could be provided if the factory-installed instrumentation does not include such a warning light.

Similarly, a dipstick type sensor could be provided for measurement of other fluids, such as the transmission fluid, radiator fluid, windshield washer fluid, and if needed, battery acid level (most modern automobile batteries are sealed and need no such indication).

Alternatively or additionally, an oil pressure sensor 127 could be included, with a connecting wire 128, and the measurement electronics required for it could also be incorporated into the electronics package 126.

The electronics package 126 may also include circuitry for determination of when the quantity being measured falls beyond preset minimum and maximum limits, and cause an audible warning to be sounded on the master unit's annunciator 77 when this happens, automatically displaying which fluid sensor 120 or 127 is responsible for the alert on the LCD display 76.

The measurements may be activated or deactivated by the use of switches 78–79 on the master unit 1, if the slave unit 3 also contains a slave receiver (not shown) and means (also not shown) for activating or deactivating the sensor electronics package 126.

These and other applications of the basic master and slave unit intercommunications technology which is the subject matter of the present invention will be apparent to those skilled in the art, and the description of the preferred embodiments disclosed above is intended to illustrate, and not to limit, the many possible embodiments of this invention which may be employed in an automobile, boat, recreational vehicle, trailer, private aircraft, or any other environment where direct current power is available and pre-wired harnesses may be used for distribution of intercommunication signals for control and telemetry, and for other uses. Many other modifications and embodiments may be implemented without departing from the spirit of the invention.

What is claimed is:

1. An apparatus for transmitting and receiving telemetry and control signals via an existing direct current power circuit, comprising:

a transmitter circuit connected to said power circuit at a first location for generating a pulsed signal coded according to a desired telemetry or control function and for imposing said pulsed signal on said power circuit, said pulsed signal being similar to a noise induced by existing electrical activity caused by other devices connected to said power circuit, but having a more regular and controlled periodicity, whereby said pulsed signal is prevented from interfering with other devices connected to said power circuit by existing precautions in said other devices directed to said noise, but is discernable from said noise based on said more regular and controlled periodicity; and a receiver circuit at a second location connected to said power circuit for determining the presence of said pulsed signal in said power circuit and for regenerating and decoding said pulsed signal to perform said desired telemetry or control function.

2. The apparatus of claim 1 further comprising:

a second transmitter circuit connected to said power circuit at said second location for transmitting a second pulsed signal coded according to a second desired telemetry or control function on said power circuit; and a second receiver circuit connected to said power circuit at said first location for determining the presence of said second pulsed signal in said power circuit and for regenerating and decoding said second pulsed signal to perform said second desired telemetry or control function.

3. The apparatus of claim 1, said transmitter generating said pulsed signal as a train of pulses modulated according to a predetermined code representing said desired telemetry or control function.

4. The apparatus of claim 1, said transmitter circuit comprising:

an electrical transducer for converting a desired measured quantity or user input into an electrical signal;

a signal encoding circuit for converting said electrical signal into said pulsed signal; and a circuit for creating a signal in said power circuit as a function of said pulsed signal.

5. The apparatus of claim 4, said signal encoding circuit comprising a crystal-controlled oscillator and a frequency divider.

6. The apparatus of claim 5, said circuit for creating said signal comprising:

an electronic switch having a switched current path controlled by said pulsed signal applied to a control terminal of said electronic switch; and impedance means connected in series with the switched current path of said electronic switch;

said impedance means and said switch current path being connected between a power supply conductor and ground of said power circuit so as to cause said pulsed signal to be created in said power circuit whenever said switched current path is conductive.

7. The apparatus of claim 6, said electronic switch comprising a bipolar transistor.

8. The apparatus of claim 6, said electronic switch comprising a field-effect transistor.

9. The apparatus of claim 6, said impedance means comprising a resistor and an inductor in series.

10. The apparatus of claim 6, wherein said impedance means comprising a resistor in series with an inductor, and a capacitor in parallel with said resistor and said inductor.

11. The apparatus of claim 4, wherein said transmitter generate said pulsed signal as a train of pulses modulated according to a predetermined code indicative of said desired measured quantity or user input.

12. The apparatus of claim 4, wherein said transmitter generate said pulsed signal as a train of pulses at a predetermined frequency.

13. The apparatus of claim 4, said electrical transducer comprising a switch operable by a user.

14. The apparatus of claim 4, said electrical transducer comprising a circuit for generating a unique identification code, said receiver circuit being responsive to said unique identification code to identify and compare said identification code with a predetermined code stored in said receiver circuit, said receiver circuit providing said desired telemetry or control function only when said identification code generated by said transmitter circuit matches said predetermined code stored in said receiver circuit.

15. The apparatus of claim 4, said electrical transducer being sensitive to one or more of fluid level, pressure, or temperature.

16. The apparatus of claim 4, said electrical transducer being sensitive to engine oil pressure.

17. The apparatus of claim 4, said electrical transducer being sensitive to engine oil level and temperature.

18. The apparatus of claim 4, said electrical transducer being sensitive to transmission fluid level and temperature.

19. The apparatus of claim 4, said electrical transducer being sensitive to battery acid level.

20. The apparatus of claim 4, said electrical transducer being a radar detector.

21. The apparatus of claim 4, said electrical transducer being sensitive to a distance of an object from said electrical transducer.

22. The apparatus of claim 1, said receiver circuit comprising:

amplifier circuitry for monitoring and amplifying voltage fluctuations on said power circuit due to said pulsed signal;

pulse recovery circuitry for determining, from said voltage fluctuations, transition times of said pulsed signal, and for reconstituting therefrom a coded signal indicative of said desired telemetry or control function; and decoder circuitry for determining from said pulsed signal a measured quantity or user input represented thereby and for outputting a decoded signal.

23. The apparatus of claim 22, further comprising display and actuator means for displaying said measured quantity or user input and for performing a desired function as determined by said measured quantity or user input.

24. The apparatus of claim 22, said amplifier circuitry comprising an operational amplifier coupled to said power circuit through a capacitor.

25. The apparatus of claim 22, said pulse recovery circuitry comprising circuitry for detecting voltage spikes occurring at transition times of said pulsed signal and for generating a rectangular pulse of predetermined length each time said voltage spike is detected.

26. The apparatus of claim 22, said pulse recovery circuitry comprising:

an input and an output terminal;

a capacitor, having an ungrounded terminal and a grounded terminal;

a diode having a cathode connected to the input terminal and an anode connected to the ungrounded terminal of said capacitor;

a resistor having a first end connected to a power source and a second end connected to the junction of said diode and said capacitor; and an amplifier having an amplifier input connected to the junction of said diode and said capacitor, and an amplifier output connected to the output terminal;

said pulse recovery circuitry being operative to discharge said capacitor whenever a voltage spike of sufficient size and appropriate polarity is presented to the input terminal, causing the amplifier output to change state for a period of time until said capacitor is substantially recharged by said resistor, thereby generating a train of rectangular pulses of predetermined length at the repetition frequency of the voltage spikes presented at the input terminal.

27. The apparatus of claim 22, said decoder circuitry comprising a comparator, operative to compare a received pulse repetition frequency of a train of rectangular pulses generated by said pulse recovery circuitry with a signal of predetermined frequency, and for providing an output signal whenever the received pulse repetition frequency substantially equals the signal of predetermined frequency.

28. The apparatus of claim 27, further comprising a crystal controlled oscillator and a frequency divider together generating said signal of predetermined frequency, said predetermined frequency being substantially equal to a frequency generated in the transmitter circuit.

29. The apparatus of claim 28, said crystal controlled oscillator comprising means for locking the signal of predetermined frequency into synchronization with said train of rectangular pulses generated by said pulse recovery circuitry, whenever the frequency of the train of rectangular pulses approximately equals the predetermined frequency.

30. The apparatus of claim 22, further comprising means for monitoring a voltage of a battery and for displaying an indication when the voltage of the battery exceeds a predetermined voltage.

31. The apparatus of claim 22, said transmitter generating said pulsed signal as a train of pulses modulated according to a predetermined code to represent the desired telemetry or control function.

32. The apparatus of claim 22, said decoder circuitry determining from said pulsed signal a unique identification code and comparing said unique identification code with a predetermined code stored in said receiver circuit, and providing a signal for operating a display and actuator means whenever said unique identification code matches said predetermined code stored in said receiver circuit.

33. The apparatus of claim 23, said display and actuator means comprising:

means for connecting to the terminals of a main battery, said main battery providing direct current power to said power circuit; and a spare battery for recharging said main battery, when said transmitter circuit provides pulses at a frequency substantially equal to the frequency of the internally generated signal and when said main battery voltage has a voltage lower than a predetermined voltage.

34. The apparatus of claim 23, said display and actuator means comprising:

current determining means for determining whether a large current is flowing, indicative of engine start; and means for disconnecting from said power circuit said main battery providing power to said power circuit whenever said current determining means determines that said large current is flowing, and said decoded signal from said decoder means is not present.

35. The apparatus of claim 23, said display and actuator means comprising means for conveying a message upon activation of a switch.

36. The apparatus of claim 23, said display and actuator means comprising one or more of a digital display and sound transducer.

37. The apparatus of claim 36, further comprising:

at least one user operable switch;

a second transmitter circuit at said second location for transmission of coded signals representing a status of said at least one switch; and a second receiver circuit at said first location for activating or deactivating the transmitter circuit in response to the status of said at least one switch.

38. The apparatus of claim 36, said display and actuator means displaying a measurement corresponding to an encoded signal from an electrical transducer at said first location, said electrical transducer measuring one or more of a fluid temperature, or pressure level.

39. A method for transmitting and receiving telemetry and control signals via an existing direct current power circuit, comprising:

generating at a first location connected to said power circuit a pulsed signal coded according to a desired telemetry or control function, said pulsed signal being similar to a noise induced by existing electrical activity caused by other devices connected to said power circuit, but having a more regular and controlled periodicity, whereby said pulsed signal is prevented from interfering with other devices by existing precautions in said other devices directed to said noise but is discernable from said noise based on said more regular and controlled periodicity;

imposing said pulsed signal on said power circuit;

monitoring at a second location connected to said power circuit the presence of said pulsed signal in said power circuit;

detecting said pulsed signal at said second location; and performing said desired telemetry or control function as a result of said detection.

40. The method of claim 39, further comprising:

generating at said second location a second pulsed signal representing a desired second telemetry or control function, said second pulsed signal being similar to said noise, but having a more regular and controlled periodicity, whereby said second pulsed signal is prevented from interfering with other devices by existing precautions in said other devices directed to said noise but is discernable from said noise based on said more regular and controlled periodicity;

imposing said second pulsed signal on the said power circuit;

monitoring at said first location the presence of said second pulsed signal in said power circuit;

detecting said second pulsed signal at said first location; and performing said desired second telemetry or control function, as a result of said detection of said second signal.

* * * * *